United States Patent [19]
Smith

[11] Patent Number: 5,935,692
[45] Date of Patent: Aug. 10, 1999

[54] COMPOSITE FOR IN MOLD TRANSFER PRINTING

[75] Inventor: John Ralph Smith, Gansevoort, N.Y.

[73] Assignee: Decora Industries, Inc., Fort Edward, N.Y.

[21] Appl. No.: 08/947,526

[22] Filed: Oct. 2, 1997

Related U.S. Application Data

[62] Division of application No. 07/957,196, Oct. 6, 1992, Pat. No. 5,707,472.

[51] Int. Cl.⁶ ........................................... B32B 3/00
[52] U.S. Cl. ..................... 428/195; 428/204; 428/207; 428/458; 428/473.5; 428/68; 428/76
[58] Field of Search ........................ 428/195, 204, 428/206, 207, 208, 209, 458, 76, 68, 673.5

[56] References Cited

U.S. PATENT DOCUMENTS

| | | | |
|---|---|---|---|
| 170,941 | 12/1875 | Dunbar et al. . | |
| 213,784 | 4/1879 | Smith . | |
| 2,643,417 | 6/1953 | Smith . | |
| 2,889,651 | 6/1959 | Baldanza . | |
| 3,930,084 | 12/1975 | Shields | 428/67 |
| 4,059,471 | 11/1977 | Haigh | 156/244 |
| 4,202,663 | 5/1980 | Haigh et al. | 8/471 |
| 4,369,157 | 1/1983 | Conner | 246/246 |
| 4,460,429 | 7/1984 | Coscia et al. | 156/384 |
| 4,519,972 | 5/1985 | Stevenson | 254/245 |
| 4,643,789 | 2/1987 | Parker et al. | 156/219 |
| 4,715,913 | 12/1987 | Middleton | 156/85 |
| 4,766,053 | 8/1988 | Shinozaki et al. | 430/245 |
| 4,869,957 | 9/1989 | Vankerckhoven et al. | 428/352 |
| 4,891,254 | 1/1990 | Bianco | 428/78 |
| 4,931,248 | 6/1990 | Willemin | 264/266 |
| 5,152,861 | 10/1992 | Hann | 156/230 |
| 5,686,186 | 11/1997 | Enlow et al. | 438/423.1 |
| 5,725,712 | 3/1998 | Spain et al. | 186/230 |

FOREIGN PATENT DOCUMENTS

| | | |
|---|---|---|
| 0346474 | 12/1989 | European Pat. Off. . |
| 56-146717 | of 0000 | Japan . |
| 560184 | 9/1942 | United Kingdom . |
| 2049554 | 12/1980 | United Kingdom . |
| 2166383 | 11/1984 | United Kingdom . |

*Primary Examiner*—Merrick Dixon
*Attorney, Agent, or Firm*—Hedman, Gibson & Costigan, P.C.

[57] ABSTRACT

A transfer composite for in-mold decoration of molded plastic or rubber articles complexing a casting substrate having a controlled release surface, and a thin discontinuously printed pressure sensitive adhesive tape-strippable pattern deposited on the casting substrate, whereby the transfer composite is suitable for inserting into a mold and adapted to resist print-distorting movement during flow of plastics or rubbers in the mold, yet capable of permanently bonding to the molded article without the use of adhesives. After removal from the mold the casting substrate and the controlled release surface are stripped from the decorated article.

10 Claims, 4 Drawing Sheets

DISCONTINOUSLY PRINTED TRANSFER COMPOSITE

DECORATED MOLDED ARTICLE

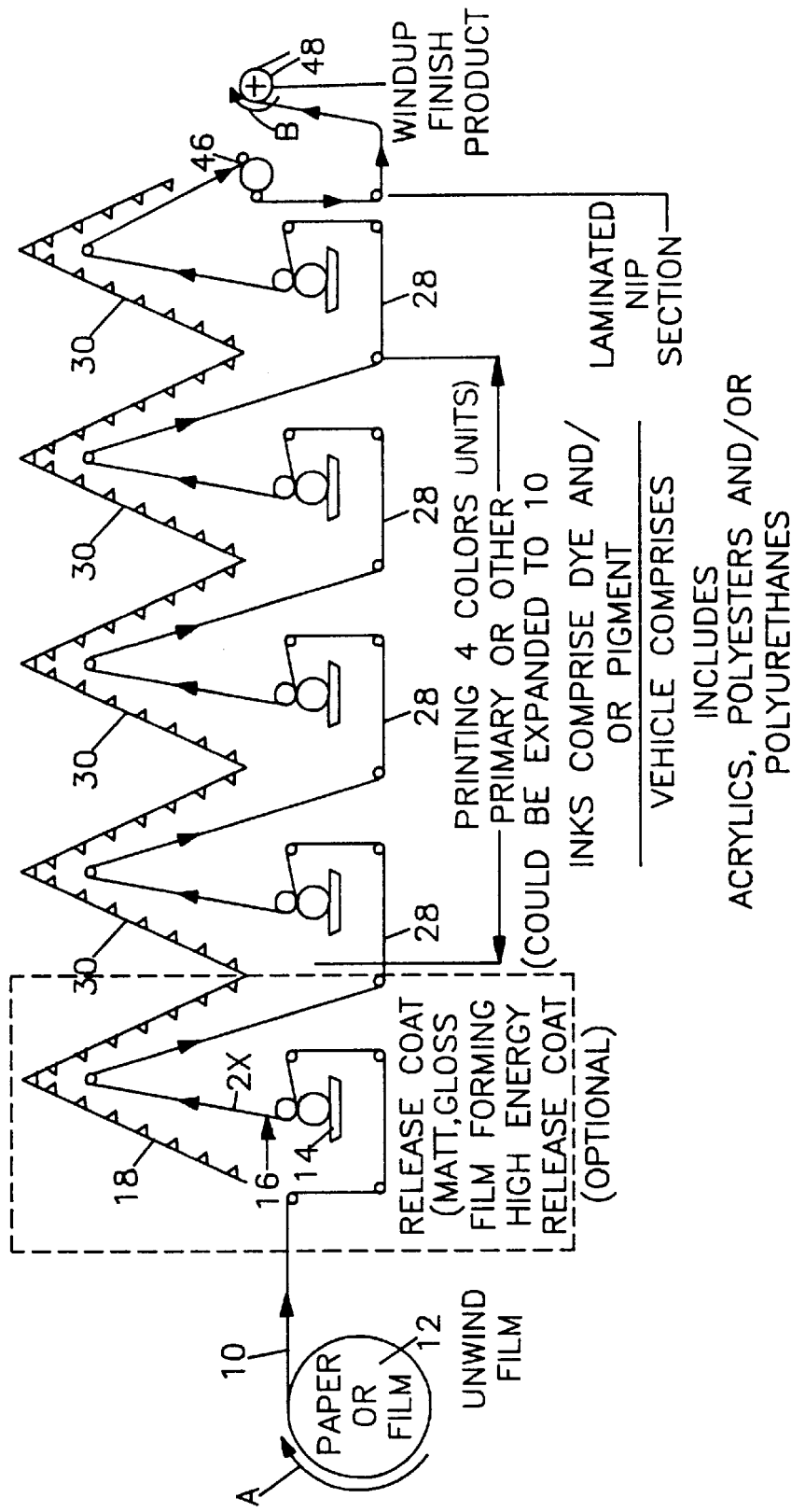

COMPOSITE FOR IN MOLD TRANSFER PRINTING

This is a divisional, of application Ser. No. 07/957,196, filed Oct. 6, 1992 U.S. Pat. No. 5,707,472.

This invention relates to casting substrates, release substances, and printing inks comprising pigments and/or dyes and a polymeric vehicle, and use of the combination thereof in making up molded articles decorated during molding by transfer of printed indicia from the combination to the surface of the articles.

BACKGROUND OF THE INVENTION

Methods for decorating plastic and rubber surfaces with printed films are matters of common knowledge and experience.

For example, transfer printing papers for plastics are commercially available, and they are useful for the fast, efficient and inexpensive decoration of poly(vinyl chloride) and polyurethane materials, by way of illustrative examples. With such films, rigid plastics can be printed with perfect register and without distortion. On the other hand, with rubbery substrates, and especially with heat-cured rubbery polymers, such films may not be used because the extensiblilty of the rubber and the heat used in molding leads to serious problems with distortion and adhesion.

Representative of the current state of the art of in-mold decoration of vulcanizable rubbery substrates are Komatsuzaki, EPO Published Patent No. 0,346,474, Dec. 20, 1989, and Hinishi, Japanese Patent Publication No. SH056-146,717, Nov. 14, 1981.

In the EPO application, a heat resistant flexible plastic film is used as a transfer plate for in-mold printing, simultaneous with shaping of a contact rubber body. A complex three-part mold is used, one part of which is used to keep the transfer film out of contact with the curable rubber, and this assists in keeping the print from smearing. It is, however, difficult in practice to keep the print from flaking off of the rubber because the heat used during molding and vulcanization interferes with adhesion.

The in-mold decorating of synthetic resins and rubbers with less complex molds and dry transfer films is also described in the above-mentioned Japanese Patent Publication in which there is used a transfer film (1) having at least a release coating layer (3), printing ink layer (4), and adhesive coating layer (5) on a substrate film (2). The transfer film is cut to suit the outside size of a molding to be formed, and is fitted into a mold (6). A resin molding is then formed, and the adhesive layer (5), printing ink layer (4) and release layer (3) are transferred onto the surfaces of the molding. After forming, the substrate film (2) only is removed, thereby forming continuous decoration, e.g., in the bottom and sides of the molding. Because, however, the release layer stays on the outside of the molded article there is a serious drawback, and that is the tendency of water to bead on the decorated surface, causing safety problems and slippery conditions when, for example, in-mold decorated bath mats, and the like are made with such transfer films. Moreover, the decoration is affixed to the article by means of an adhesive which necessarily must develop enough bond between the substrate and the print layer to assure permanency. This is difficult to accomplish during molding because the plastic must flow to fill the mold and the lateral shearing stresses developed between the adhesive coating layer (5) and the printing ink layer (4) have been found in practice to exhibit a strong tendency to distort the image.

It has now been found that if the procedures of the prior art are modified to eliminate all use of an adhesive layer, and if the thin resin film is replaced by a thin discontinuous pattern printed with an ink comprising a pigment and/or dye and a polymeric vehicle, and if the substrate paper or film is provided with a printable controlled release surface of a judiciously selected type, then, in contrast to the Japanese Patent Publication disclosure, the substrate film and the controlled release surface both are removed, leaving a non-slippery decorated article. Furthermore, if the polymeric vehicle for the ink is judiciously selected, the decoration will adhere semi-permanently to the controlled release surface during molding, thereby permitting the ink to transfer and embed itself into the molded article without distortion due to shearing in the mold and without the need later to rely on any adhesive for permanently bonding the decoration to the article. Semi-permanent adherence is easily determined, for example, by lifting with pressure sensitive tape in accordance with well-established procedures in this art.

SUMMARY OF THE INVENTION

It is an object of the invention to provide a composite laminate that produces an in-mold transfer-printed decorative surface which permanently adheres to molded resin or rubber articles;

It is another object of the invention to provide a composite laminate that produces a decorative surface which does not permanently adhere to a flowing plastic or rubber during molding, avoiding distortion of printed indicia during molding, but which ultimately embeds the design in the surface of the articles without the use of any adhesive;

It is another object of the invention to provide a laminated composite for producing a decorated surface on a plastic article during molding while avoiding the transfer of a water-beadable, release layer from the discardable substrate to the decorated surface.

These and other objects are achieved by a transfer composite for the in-mold transfer printing of decorative indicia on a molded plastic or rubber, the composite comprising:

(i) a casting substrate;
(ii) a printable permanently-adhered controlled-release surface thereon;
(iii) a thin pressure sensitive adhesive tape-strippable pattern printed thereon discontinuously with an ink comprising a pigment or a dye and a polymeric vehicle.

Special mention is made of a preferred form of the composite wherein the casting substrate comprises paper or a polymer film; one in which the polymer is selected from polyethylene, polypropylene, poly(vinyl chloride), polyester, polyurethane, polyacrylate, polycarbonate, polyamide, natural or synthetic rubber or a blend comprising any of the foregoing; those wherein the controlled-release surface of the casting substrate has a higher surface energy than that obtained with conventional silicone release coatings. Surface tensions greater than 23 dynes/cm is the lower end of the range for the controlled release surface. In addition, the controlled release surface will have inherent film forming properties that are self supporting. Typically, suitable surface tensions are 25 and 30 dynes/cm, although these are not limiting values. Also among the preferred features of the invention are transfer composites as above defined wherein the ink comprises a pigment or a dye and the vehicle comprises a thermoplastic or a thermosetting resin; those wherein the vehicle comprises a vinyl polymer or copolymer resin, a polyamide, a polyolefin, a polyester, a polyurethane, an epoxy resin, styrene-butadiene resins, nitrile rubbers, other vehicles well-known to those skilled in this art, and the like, or a mixture of any of the foregoing. In the transfer composites of this invention wherein the ink selected will have adequate heat resistance properties to prevent distortion of the print message to an unrecognizable state upon heat fusing of the rubber compound. Furthermore the ink used will provide adequate anchoring to the rubber so that when the rubber is extended to 100% elongation the ink will not readily flake off. Such inks are well known to those skilled in this art. Also preferred are transfer composites according to this invention wherein the strippable pattern (A)(iii) is a pigmented opaque thin film adapted to provide the decorated surface of the molded article with the appearance of dry paint.

The invention, in a second major aspect, also contemplates a process for the in-mold printing of indicia onto a molded plastic or rubber article, said process comprising:

(A) forming a transfer composite by
  (i) providing a casting substrate;
  (ii) providing a printable permanently-adhered controlled-release surface thereon;
  (iii) printing a thin, pressure sensitive adhesive tape-strippable pattern thereon discontinuously with an ink comprising a pigment or a dye and a polymeric vehicle;
(B) fitting the transfer composite into a mold;
(C) forming a molding in the mold whereby the printing ink pattern is transferred onto the surface of the molding and decorates it; and
(D) removing the casting substrate (A)(i) and the controlled release surface (A)(ii) from the decorated molding while leaving the pigment or dye and the vehicle embedded in surface of the molding.

BRIEF DESCRIPTION OF THE DRAWINGS

FIG. 9 is a schematic diagram of a process and apparatus in which a transfer composite in accordance with the present invention can be produced.

DETAILED DESCRIPTION OF THE INVENTION

Figure 1:
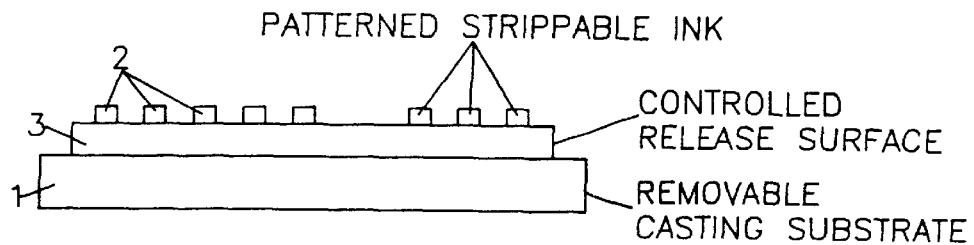
FIG. 1 is a cross-sectional view of a transfer composite according to the invention, showing a removable casting substrate, a controlled release surface and a patterned layer of a strippable ink.

The decorative composite for in-mold decorating of plastic an rubber articles according to the invention comprises a layer of a thin discontinuously printed ink deposited on a casting substrate or top sheet provided with a controlled release surface, either inherently, e.g., by selecting a polyolefin or polyolefin-coated substance, or by a coating operation. The casting substrate or top sheet in the preferred embodiment, acts as a removable protective layer and provides strength to the thin printed ink pattern during processing and application.

The casting substrate or top sheet, may be composed of any substance that is capable of forming the composite with the thin discontinuously printed pattern to achieve the desired degree of attraction necessary to maintain the thin pattern on the casting substrate at the desired release force. Degree of attraction, as defined herein, is the force of attraction created between the casting substrate and printed pattern. It will be obvious that a certain desired release force is needed to overcome the London or dispersion force created in order to separate the casting substrate from the printed pattern. However, the release force must also be sufficient to prevent flowing resin in the mold from distorting the pattern. The release force can be controlled, i.e., maintained, to any desired level, if necessary, by either selecting a substrate, such as polypropylene or a paper surfaced with polypropylene, by way of illustration, or also by using a controlled-release coating, cast, laminated or deposited from a liquid medium onto the casting substrate to provide a matte or glossy finish.

Preferably, the casting substrate is paper or a thermoplastic film, preferably selected from high density polyethylene, low density polyethylene, polypropylene, polyester, polyurethane, polyacrylate, polycarbonate and SURLYN® ionomers, and it not a requirement that the casting substrate be transparent.

The printed pattern, which is deposited onto the controlled release surface of the casting substrate or top sheet, is a thin, e.g., generally but not restricted to deposits as low as 0.25 to 25 microns (0.01 to 1.0 milli-inches) in thickness, pattern comprised of a pigment and/or a dye and a polymeric vehicle.

The thin printed pattern can be formed by any conventional printing process. Preferably the pattern is formed by passing at least the controlled release surface of the casting film continuously into contact with a transfer roller bathed with the film forming material in a liquid medium under conditions appropriate to achieving a London or dispersion force that permits the casting substrate to be stripped from the printed pattern at a desired release force. The composite is then is sent through a conventional curing oven where it bonds to the casting substrate under elevated conditions of temperature.

Composite webs to be employed require minimum release force to strip the printed pattern from the casting substrate. In the present invention this is accomplished by judicious selection of the substrate or by use of a controlled release coating thereon. As has been mentioned, the controlled-release surface of the casting substrate has a higher surface energy than that obtained with conventional silicone release coatings. Surface tensions greater than 23 dynes/cm is the lower end of the range for the controlled release surface. In addition, the controlled release surface will have inherent film forming properties that are self supporting. Typically, suitable surface tensions are 25 and 30 dynes/cm, although these are not limiting values.

The controlled release-surfaced casting substrate may be converted a the transfer printing composites by subjecting the substrate either in roll or sheet form to methods of operation known in the industry for coloring, e.g., by including a pigment in the thin film resin or by inline printing and die cutting. One-color and multi-color printing machines well known to the industry may be used for this purpose. Transfer printing can also be used to decorate the casting substrate in ways well known to those skilled in the art.

With reference to the figures, FIG. 1 displays the basic arrangement of the preferred embodiment of the invention. The removable casting substrate is attached to the thin, patterned strippable ink through a controlled release surface at a desired release force. The transfer composite web may be fitted into a conventional mold and used as such.

Figure 2:
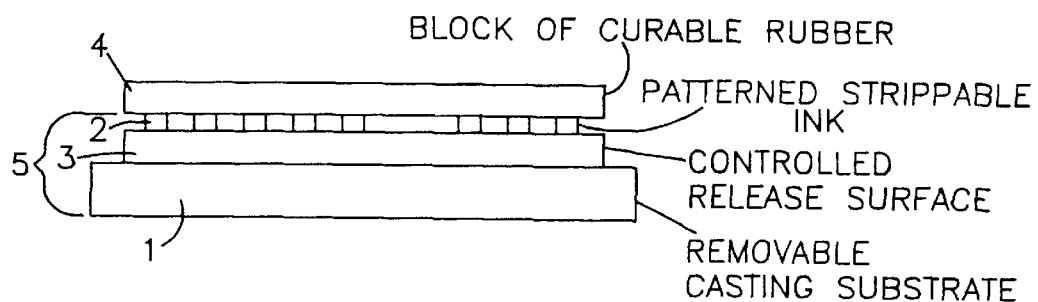
FIG. 2 is a cross sectional view of the transfer composite of FIG. 1 positioned under a curable block of rubber to be decorated by the in-mold transfer printing process of the invention.

FIG. 2 is a cross-sectional view of the transfer printing composite 5 according to the invention, made up of casting substrate 1 and thin discontinuously printed ink pattern 2 deposited onto controlled release surface 3, above which is positioned a block of curable resin composition to be decorated 4. Typically, block 4 will comprise a moldable plastic of almost any type, as well as natural and synthetic rubbers, including sulfur-vulcanizable or peroxide curable and/or heat-curable styrene-butadiene rubbery copolymer and natural rubbers, and the like, such as is used to make bath mats, molded containers, and similar articles.

Figure 3:
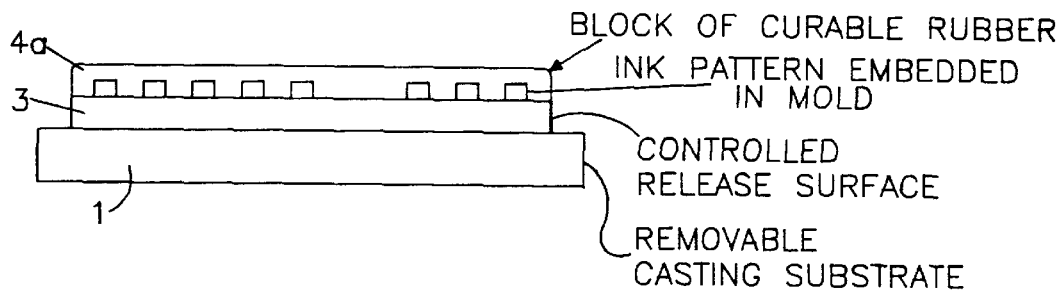
FIG. 3 is a cross-sectional view of the block of cured rubber of FIG. 2 after being molded in contact with the transfer composite of FIG. 1, showing that the ink pattern has become embedded in the surface of the rubber so as to decorate it.

FIG. 3 illustrates the transfer printed cured block of rubber 4a, showing how the ink comprising pigment or dye and polymeric vehicle is embedded in the surface of the rubber in a decorative pattern under the heat and pressure of the mold (not shown).

Figure 4:
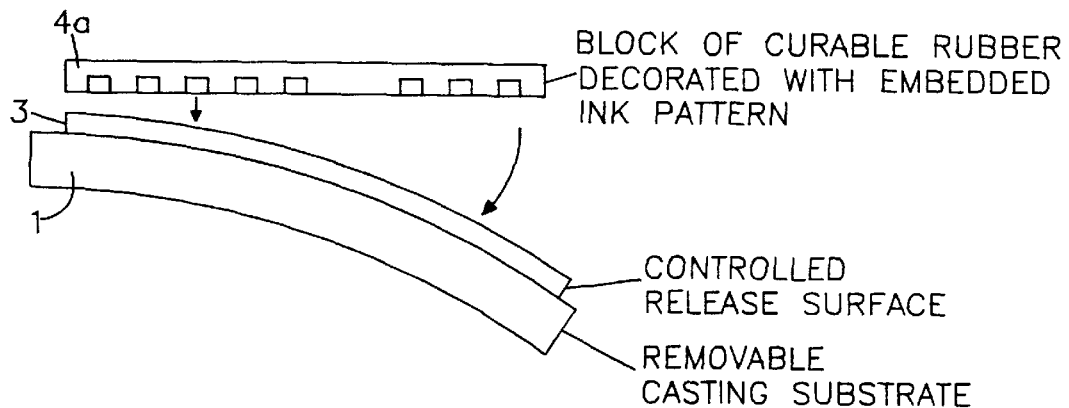
FIG. 4, in a cross-sectional view, illustrates the removal of the casting substrate together with the controlled release surface in accordance with the invention, leaving a clean, permanently decorated surface on the molded article.

FIG. 4 illustrates the removal of the casting substrate 1, together with the controlled release surface 3 from the surface of the decorated article 4a.

Figure 5:
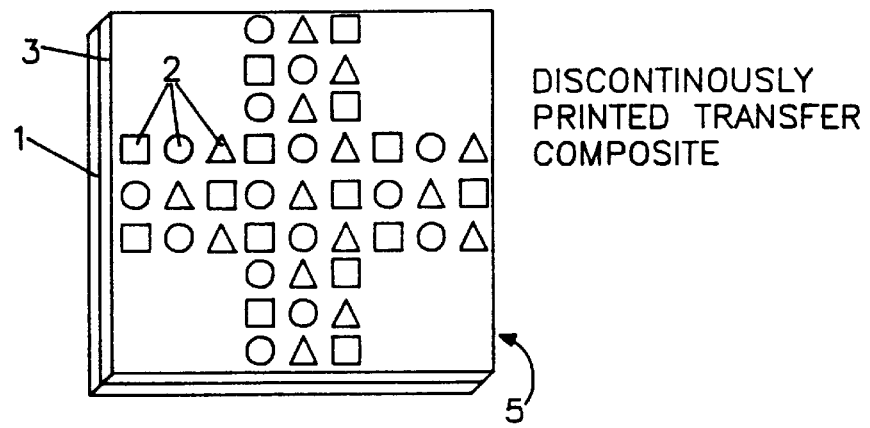
FIGS. 5, 6A, 6B, 7A and 7B, respectively, show in perspective and cross-sectional views the in-mold decoration of one surface of a rubber mat by fitting a discontinuously printed transfer composite (FIG. 5) into the cavity of a two-part hinged mold containing a curable rubber mass (FIGS. 6A and 6B), closing the mold (FIGS. 7A and 7B). After re-opening the mold, the decorated mat can be removed and the casting substrate and controlled release surface are peeled off.
Figure 6A:
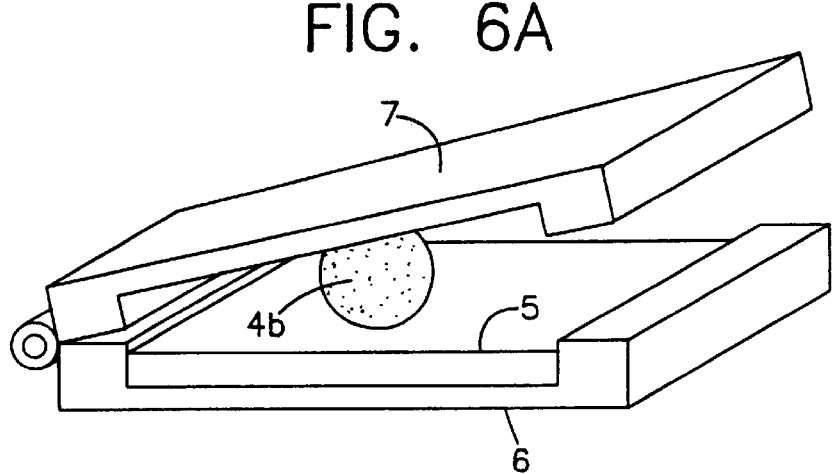
Figure 7A:
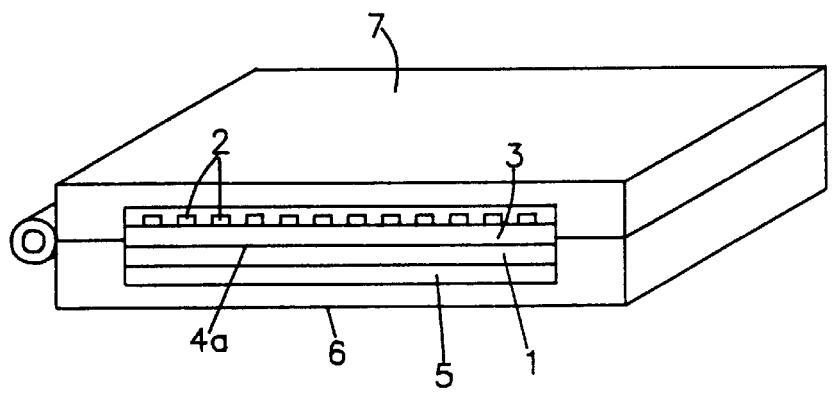
Figure 6B:
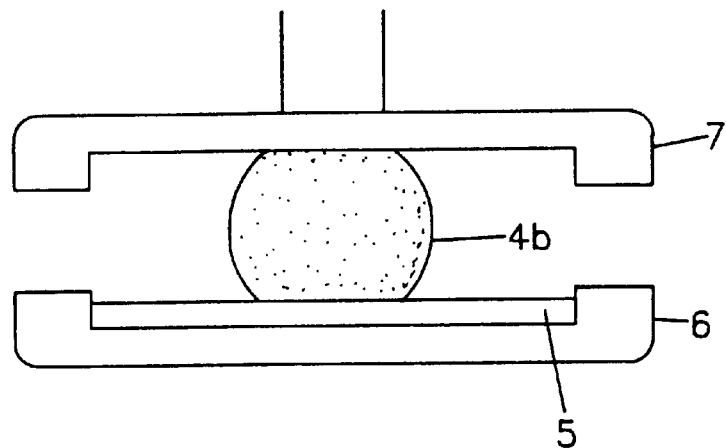
Figure 7B:
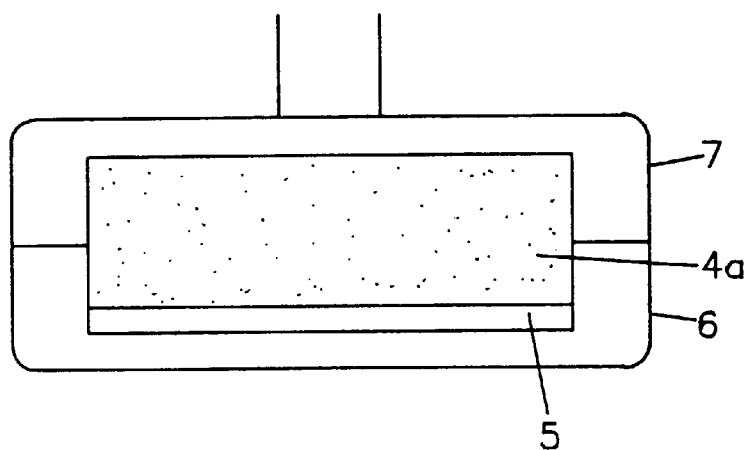
Figure 8:
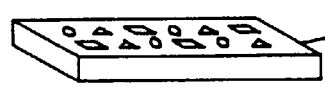
FIG. 8 is a perspective view of the decorated molded rubbery mat produced by the steps shown sequentially in FIGS. 5–7B, inclusive and stripping off the casting substrate.

FIG. 5 shows a discontinuously printed transfer composite 5 cut to fit the cavity of a mold and FIGS. 6A and 6B show how the composite fits into the base 6 of a hinged compression mold containing a weighed mass 4b of curable plastic or rubber composition. In-mold transfer printing is accomplished by lowering mold cover 7 into contact with the base 6 and this forms a molded mat 4a as shown in FIGS. 7A and 7B, decorated with printing embedded in its surface. Stripping removes casting substrate 1 and release surface 3 and the decorated article is shown in FIG. 8.

FIG. 9 shows a flow diagram and represents apparatus suitable for forming a transfer composite in accordance with the present invention. The method comprises first coating a sheet of casting material 10, which may suitably be kraft paper or other supportive plastic sheet such as polyester, as defined hereinabove, from roll 12, which turns in the direction indicated by arrow A, with a suitable controlled release composition 14 for providing a gloss or matte finish, such as, a polyolefin, or one of the other conventional materials used for this purpose.

Optionally, as is shown in the drawing, a bath, and roller arrangement 14, and a curing zone, such as oven 18, can pe provided to deposit a release coat on the casting substrate 16. This can comprise any of the materials specified above for this purpose, and known in this art.

The web 26 is then passed into contact with one or more printing or color application stations 28, each having an associated oven 30, like oven 18, for applying printing discontinuously to the controlled release surface to form the transfer composite. Such techniques are also well known to those skilled in this art. Furthermore, although four printing stations are shown more or less can used, for example, from one to ten, or more, depending on the number of colors desired.

Next, the finished printed composite web is rolled onto roll 48 which revolves in the direction indicated by arrow B. Optionally also, the apparatus can include a station for applying a thermo-activatable adhesive, the elements of which comprise a pan and roller arrangement and an associated heating zone, such as an oven. This station is optionally interposed between the last printing station and the finished product windup station.

DESCRIPTION OF THE PREFERRED EMBODIMENTS

The invention is described in further detail by the following example.

EXAMPLES 1 AND 2

Using an apparatus as generally shown in FIG. 9, six casting substrates are provided with a thin discontinuously printed pattern. The casting substrates are as follows:

| Substrate | Thickness | Surface | Treatment |
| --- | --- | --- | --- |
| PET[a] | 3.5 mils | High Gloss | Uncoated--None |
| PP[b] | 3.5 mils | High Gloss | Uncoated--None |
| PET | 4.0 mils | Semi Gloss | Low energy polyester matte coating[c] |
| PET | 4.0 mils | Dull Gloss | Flat coating[d] |
| PP | 4.0 mils | Dull Gloss | Flat coating |
| Paper | 4.0 mils | Dull Gloss | Flat coating |

[a]poly(ethylene terephthalate)
[b]polypropylene
[c]applied from a liquid medium in pan 14, FIG. 9
[d]polymer coating applied from a liquid medium in pan 14, FIG. 9

With respect to treatments under footnotes c and d, they are cured at about 350° to 400° F. for about one minute. The weight of the release coatings is in the range of 0.25 lb/3000 ft$^2$ to 4.0 lbs/3000 ft$^2$.

The controlled release surface of the web is printed in the apparatus of FIG. 9 using in the pans of four printing stations 28 two colors of green, one of rose and one of violet, the printing comprising a flowery pattern. The ink used in printing is conventional and comprises one part by weight of a copolymer of poly(vinyl chloride) and poly(vinyl acetate) as the vehicle for two parts by weight of the colored pigments, and a small amount of methylethyl ketone as a reducer.

The transfer composite thus formed can have the printing cleanly stripped off by sticking pressure-sensitive tape thereon then pulling it off.

The release values of the thin printed pattern and the release surface of the polymeric or paper casting substrates are controlled by insuring that the release energy of the release surface is greater than 23 dynes/cm this being the lower end of the range for the controlled release surface. In addition, the controlled release surface will have inherent film forming properties that are self supporting. Typically, suitable surface tensions are 25 and 30 dynes/cm, although these are not limiting values.

To demonstrate the use of above described construction as an in-mold surface decorating material, the transfer composite is unwound, and cut to fit the cavity of a heated compression mold with the printed side facing inward. A weighed amount of SBR rubber composition is then placed in the mold cavity and the mold is closed. After a suitable curing time, typically for peroxide- or sulfur-curable styrene-butadiene or natural rubber compositions, and for many thermoplastic and thermosetting resin compositions of the types set forth above, 3.5 min. at 360° F., and 500 psi, the decorated article is removed. The casting substrate and the controlled release surface is then peeled away and discarded, leaving behind permanently embedded to the surface of the molded article a thin decorated flower pattern design.

EXAMPLE 3

In-mold transfer composites are constructed in a manner similar to those of Example 1 using printing ink vehicles made from a polyamide, a polyolefin or a mixture of any of them. These vehicles are but a few of the many combinations and coatings one may use for this product. If a rubber is to be molded, the coefficient of thermal expansion of the vehicle will preferably be selected to match substantially that of the rubber, etc. The release values of the patterns from the casting substrates are such that the casting substrates and the release surfaces can be stripped from the patterns after they have been applied to the surfaces to be decorated without at the same time removing the pattern from the molded articles.

The Patents and any publications and test methods cited hereinabove are incorporated herein by reference.

While there have been described what are presently believed to be preferred embodiments of the invention, it will be apparent to a person skilled in the art that numerous changes can be made in the ingredients, conditions and proportions set forth in the foregoing embodiments. For example, instead of a polyester, polypropylene or paper casting substrate, one made of polyurethane, polyacrylate, polycarbonate, or the like, can be used. Instead of curing with heat, ultraviolet-light-activated and electron beam-activated curable coating systems can be used. All such obvious modifications can be employed without departing from the invention as described herein and as defined in the appended claims.

What is claimed is:

1. A transfer composite for the in-mold embedding of decorative indicia into the surface of a molded plastic or rubber article, said composite comprising:
   (i) a casting substrate;
   (ii) a printable controlled-release surface permanently adhered to the casting substrate;
   (iii) a thin discontinuous pattern of ink comprising a pigment or a dye and a polymeric vehicle wherein the discontinuous pattern of ink is semi-permanently adhered onto the controlled-release surface, is embedded in the surface of the molded plastic or rubber article to a depth about equal to the height of the discontinuous pattern of ink and is exposed at the surface of the plastic or rubber article.

2. The transfer composite as defined in claim 1 wherein the casting substrate comprises paper or a polymer film.

3. The transfer composite as defined in claim 2, wherein the polymer film is selected from the group consisting of polyethylene, polypropylene, poly(vinyl chloride), polyester, polyurethane, polyacrylate, polycarbonate, polyamide, natural or synthetic rubber or a blend comprising any of the foregoing.

4. The transfer composite as defined in claim 1 wherein the release energy of the casting substrate having the controlled-release surface is about 23 dynes/cm or greater and, in addition, the controlled release surface has inherent film properties that are self supporting.

5. The transfer composite as defined in claim 4 wherein the release energy of the casting substrate having said controlled-release surface is about 25 dynes/cm or greater.

6. The transfer composite as defined in claim 1, wherein the ink comprises a pigment or a dye and the vehicle comprises a thermoplastic or a thermosetting resin.

7. The transfer composite as defined in claim 6, wherein the vehicle is selected from the group consisting of a vinyl polymer or copolymer resin, a polyamide, a polyolefin, a polyester, a polylurethane, an epoxy resin, a styrene-butadiene resin, a nitrile rubber, or a mixture of any of the foregoing.

8. The transfer composite as defined in claim 1 wherein said discontinuous pattern (A) (iii) is a pigmented opaque thin layer that provides the decorated surface of the molded article with the appearance of dry paint.

9. The transfer composite as defined in claim 1 further comprising a protective layer on the surface of the article and printing ink to enhance the abrasion resistance of the ink.

10. A transfer composite for the in-mold embedding of decorative indicia into the surface of a molded plastic or rubber article, said composite consisting essentially of:
   (i) a casting substrate;
   (ii) a printable controlled-release surface permanently adhered to the casting substrate; and
   (iii) a thin discontinuous pattern of ink comprising a pigment or a dye and a polymeric vehicle wherein the discontinuous pattern of ink is semi-permanently adhered onto the controlled-release surface, is embedded in the surface of the molded plastic or rubber article to depth about equal to the height of the discontinuous pattern of ink and is exposed at the surface of the plastic or rubber article.

* * * * *